W. AUSTIN.
Tea Pot.
No. 21,589.
Patented Sept. 21, 1858.
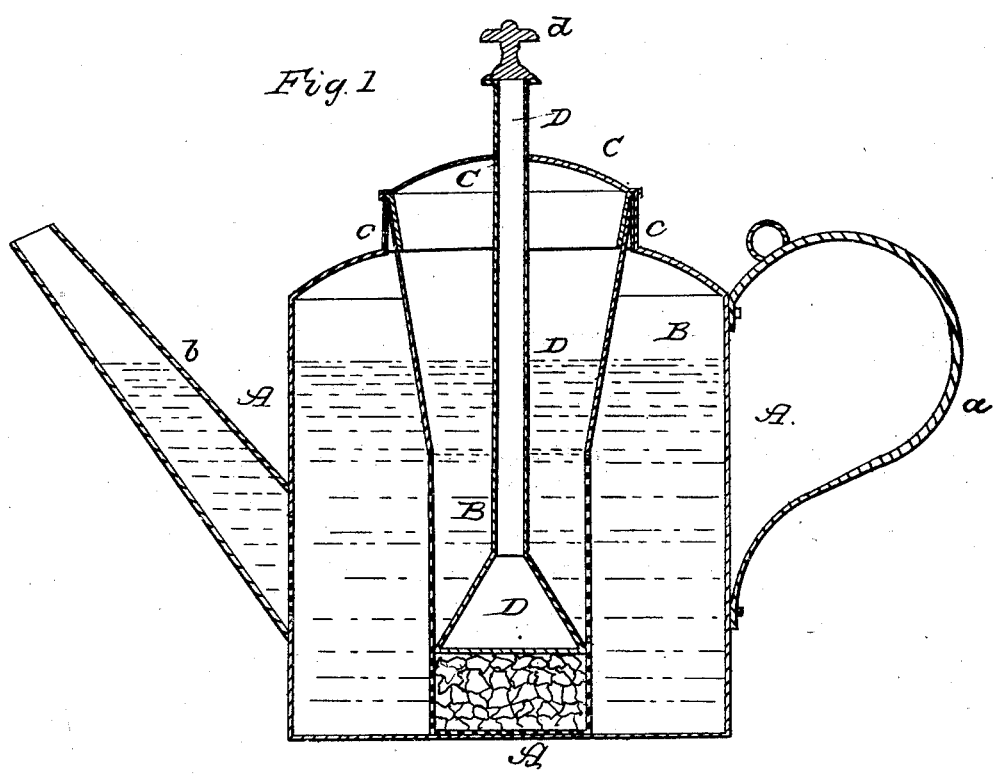
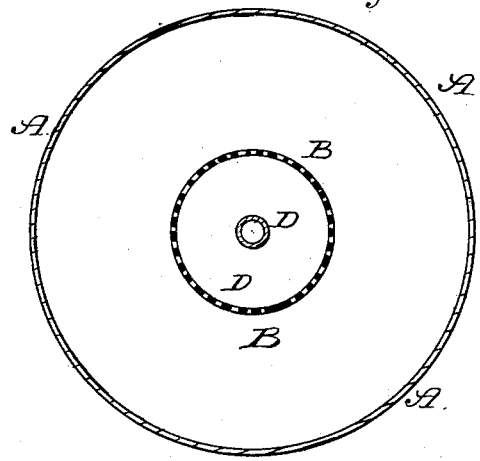

UNITED STATES PATENT OFFICE.

WILLIAM AUSTIN, OF PHILADELPHIA, PENNSYLVANIA, ASSIGNOR TO HIMSELF AND WM. OBDYKE, OF SAME PLACE.

TEAPOT.

Specification of Letters Patent No. 21,589, dated September 21, 1858.

*To all whom it may concern:*

Be it known that I, WILLIAM AUSTIN, of the city of Philadelphia and State of Pennsylvania, have invented a certain new and useful Improvement in Teapots; and I do hereby declare the following to be a full, clear, and exact description of the same, reference being had to the accompanying drawing and to the letters of reference marked thereon.

My invention consists in furnishing the inside of an ordinary tea-pot with a plunger fitting in an annular casing, and is so arranged that by depressing the said plunger, the whole strength of the tea is extracted, thereby requiring less tea to obtain the same amount of liquid, of the same strength, as that made in ordinary tea-pots.

On reference to the drawing which forms a part of this specification. Figure 1, is a sectional elevation showing my improvement in tea-pots; Fig. 2, a sectional plan of the same.

A is the outside casing, $a$ the handle, $b$ the spout; B is the interior casing, which may be made round or any other convenient shape, and is retained in its proper position by the flanches $c$. Around the lower half of this casing, and in the bottom are a number of small holes to allow the water to have access to the interior, but not large enough for the tea leaves to pass through.

C is the lid through the center of which passes the plunger D; this plunger is furnished with a knob or handle $d$ at the top, and is inclined outward at the bottom so as to fit in the inside of the casing B.

The tea is placed in the interior casing underneath the plunger, and the pot filled with hot water. After it has been standing a sufficient time, the plunger D is depressed, which consequently forces the entire strength out of the tea, in the bottom of the casing B, thus saving a great amount of tea, as it is impossible to extract all the strength from the same by merely pouring hot water upon it.

I have found by experiment that a saving of one half the amount of tea can be effected by using my invention.

The plunger can be operated either by the hand or by means of a spring attached to the handle.

I do not desire to claim the use of an interior casing for confining the tea in the inside of the same, but What I do claim and desire to secure by Letters Patent is, The plunger or presser D, in combination with the interior casing B, the whole being arranged in the manner herein set forth, or any equivalent to the same, and for the purpose specified.

WM. AUSTIN.

Witnesses:
ALEX. M. THOMPSON,
WILLIAM E. WALTON.